United States Patent

[11] 3,588,462

| [72] | Inventors | Kurt H. Kreckel<br>Webster;<br>Kallis H. Mannik, Rochester, N.Y. |
|---|---|---|
| [21] | Appl. No. | 604,235 |
| [22] | Filed | Dec. 23, 1966 |
| [45] | Patented | June 28, 1971 |
| [73] | Assignee | Bausch & Lomb Incorporated<br>Rochester, N.Y. |

[54] FRINGE INTERPOLATOR AND COUNTER
19 Claims, 9 Drawing Figs.

[52] U.S. Cl. .................................................. 235/92,
340/347, 356/169
[51] Int. Cl. ........................................................ G01b 11/04,
G06g 7/00, H03k 13/00
[50] Field of Search ............................................ 235/92
(29G); 350/162; 307/232; 356/169, 170; 324/68

[56] References Cited
UNITED STATES PATENTS
| 2,886,718 | 5/1959 | Shepherd et al. | 235/92(29G) |
|---|---|---|---|
| 3,351,768 | 11/1967 | Cooke | 356/169X |
| 3,449,743 | 6/1969 | Shepherd et al. | 235/92 |

Primary Examiner—Maynard R. Wilbur
Assistant Examiner—Thomas J. Sloyan
Attorneys—Frank C. Parker and Charles C. Krawczyk ABSTRACT: Apparatus for determining the extent and direction of movement of a movable member relative to a stationary member and more particularly to apparatus adapted to be used in conjunction with optical fringe pattern generating devices for precisely measuring minute movements in the fringe pattern.

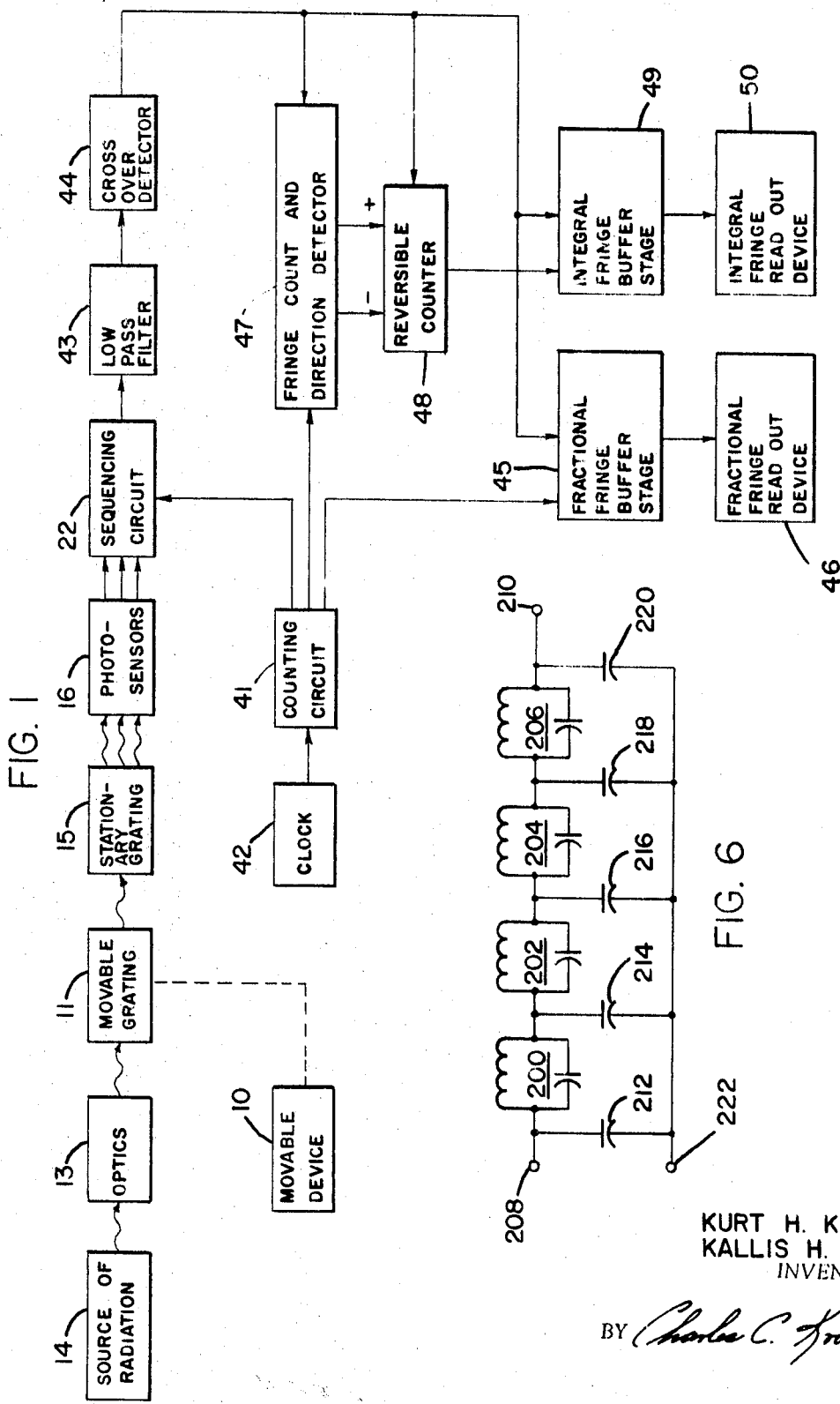

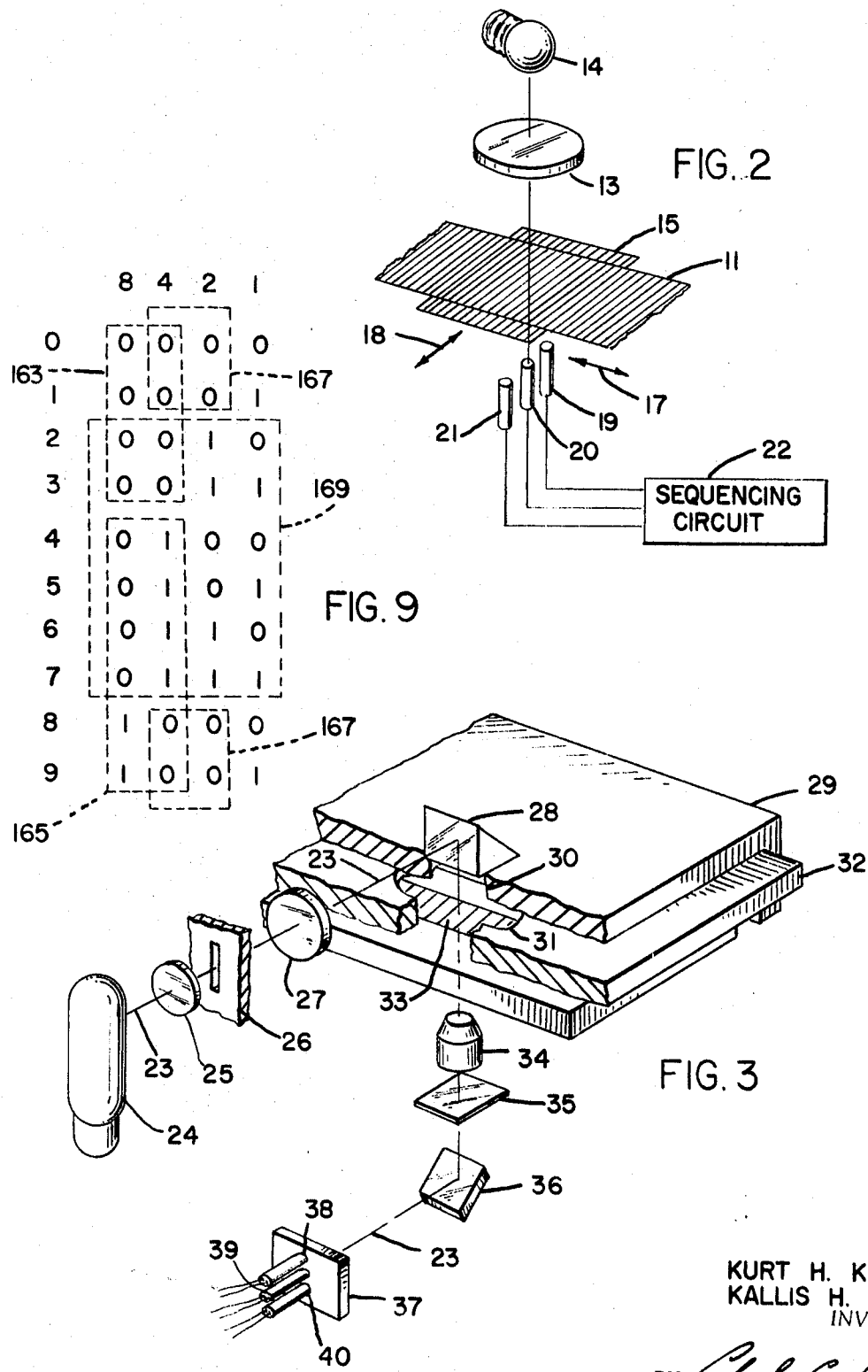

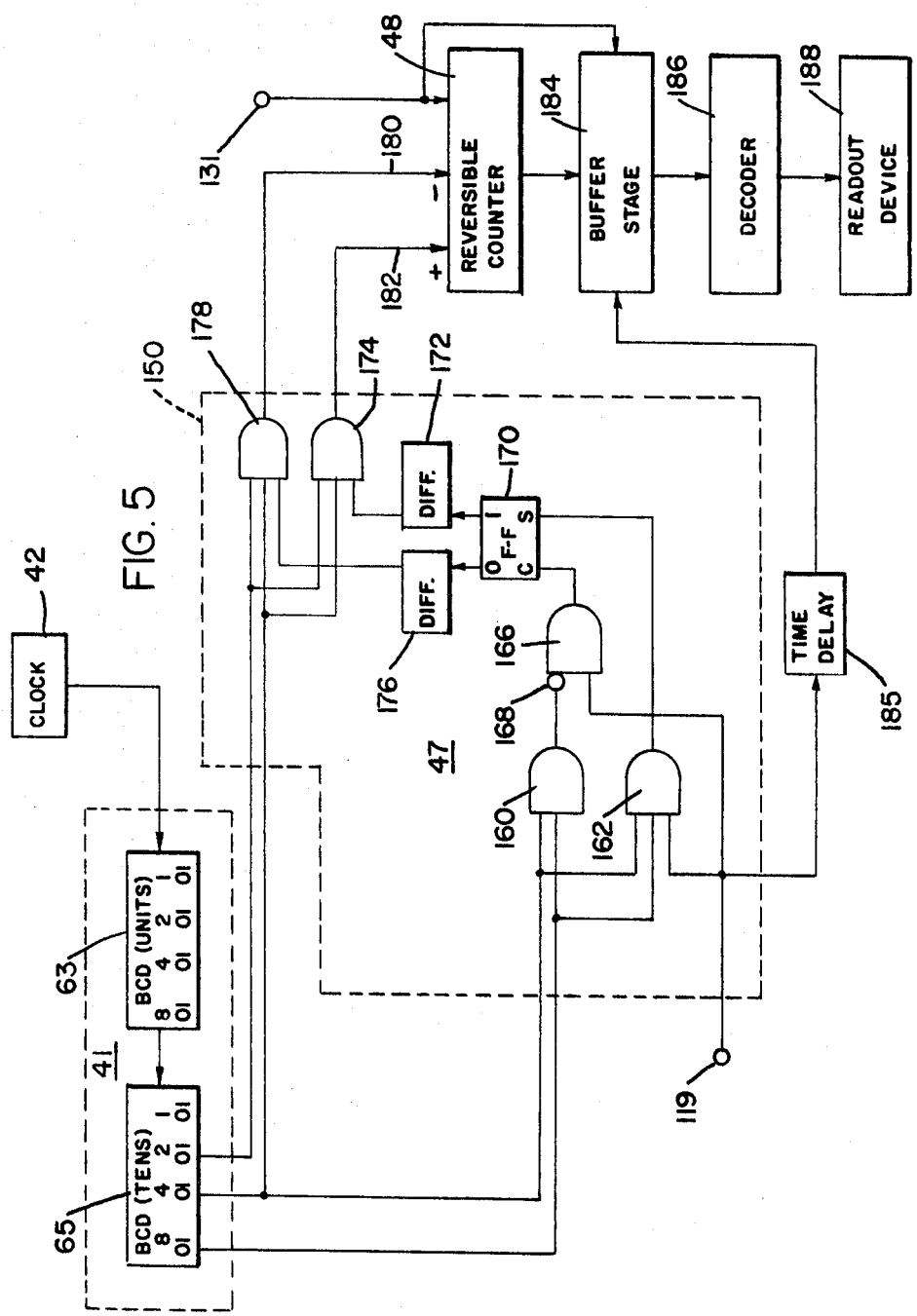

3,588,462

FRINGE INTERPOLATOR AND COUNTER

BACKGROUND OF THE INVENTION

In various ultraprecise measuring instruments, such as those employed to derive movement and/or positional information in metrological apparatus, interferometers, strain gauges, etc., optical systems are generally employed to generate a cyclic radiation fringe pattern that moves in correspondence with the object or member being observed. The movement of the fringe pattern is detected by radiation sensitive devices to provide electrical signals corresponding to the sense and the extent of movement of the object.

In the past, it has been the practice to recognize individual half cycles of the optical fringe pattern to provide a measurement of the extent of movement and an indication of the direction of movement. As a result, this approach has limited such apparatus to distinguishing minimum movements approximately equal to or greater than the half cycles of the fringe pattern. Any greater accuracy with the systems of the prior art can only be obtained by reducing the wavelength of the cyclic fringe pattern. This in turn is limited, for example, by the finest physical ruling of the gratings or fringe pattern that can effectively be achieved.

Specifically, prior art as represented by U.S. Pat. Nos. 2,886,717, and 2,886,718 issued to D. T. N. Williamson et al. and A. T. Shepherd et al., respectively, provides for cyclic wave patterns being interrogated by four detecting devices such that the conditions at the first and third detecting device positions are in approximate counterphase with one another, and the conditions at the second and fourth detecting device positions are also in approximate counterphase with one another but in approximate quadrature with the conditions at the first and third detecting device positions. Such an arrangement is capable of generating four electrical cyclic wave signals per cyclic wave permitting the pattern determination of the sense and extent of relative motion of the cyclic wave pattern with respect to the positions of the detecting devices resolving the cyclic wave pattern, in general, to as many parts as there are detecting devices or electrical cyclic wave signals. Achieving higher resolution thus requires the use of more detecting devices which has a practical limit.

Since higher resolution of cyclic wave patterns is desirable, in order to achieve higher measuring accuracies requiring smaller measuring increments, the present invention is provided to achieve resolutions which are substantially higher than those commonly achieved with prior art equipments.

Other prior art, such as that represented by U.S. Pat. No. 3,056,029 issued to G. Budnik discloses, for example, an assembly of $n$ detecting devices to achieve cyclic wave pattern interpolation to $1/n$ of a cycle, or, alternatively, time base related pulses are used by inserting them between the pulses derived from the cyclic wave pattern which requires constant or near constant velocity of the cyclic wave pattern relative to the positions of the detecting devices. Any small deviations from constant velocity are measured and used to adjust the frequency of the time based interpolation pulses.

It is therefore an object of this invention to provide a new and improved ultra precise measuring apparatus.

It is also an object of this invention to provide a new and improved measuring system adapted to recognize movements of a cyclic optical fringe pattern that is substantially less than a half cycle which does not rely on a velocity requirement and thus provides cyclic wave pattern interpolation of substantially higher resolution and avoids the limitations of the prior art.

It is a still further object of this invention to provide a new and improved measuring system adapted to provide an indication corresponding to a movement of a cyclic optical fringe pattern in number of integral cycles of movement and small fractions thereof.

BRIEF SUMMARY OF THE INVENTION

In accordance with the invention, a plurality of detection devices are mounted to receive different portions of a movable cyclic wave pattern, such as a radiation fringe pattern, to generate electrical signals having an amplitude corresponding to the intensity of the portion of the cyclic wave pattern received. Circuit means, responsive to a cyclic timing sequence, receives the electrical signals generated by the detection devices in a predetermined sequence and periodically generates a cyclic electrical signal that is time phase related to the spatial phase of the cyclic wave pattern with respect to the detection devices. Additional circuit means compares the time phase of the cyclic electrical signal with the cyclic timing sequence to provide output signals corresponding to the extent and the direction of movement of the cyclic wave pattern. The output signals provide an indication of the number of integral wave patterns moved with respect to the detection device as well as fractions thereof.

The novel features which are considered to be characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is an overall block diagram of a measuring apparatus embodying the invention.

FIG. 2 is a schematic diagram of the fringe pattern generating portion of the measuring apparatus of FIG. 1.

FIG. 3 is a second embodiment of the fringe pattern generating portion of the measuring apparatus of FIG. 1.

FIG. 5 is an expanded block diagram of a second portion of the block diagram of FIG. 1.

FIG. 6 is a schematic diagram of an embodiment of a filter circuit for the block diagrams of FIGS. 1 and 4.

FIG. 9 is a logic or truth table for illustrating the operation of the apparatus of FIG. 5.

DETAILED DESCRIPTION OF THE PREFERRED EMBODIMENTS

Figure 4:
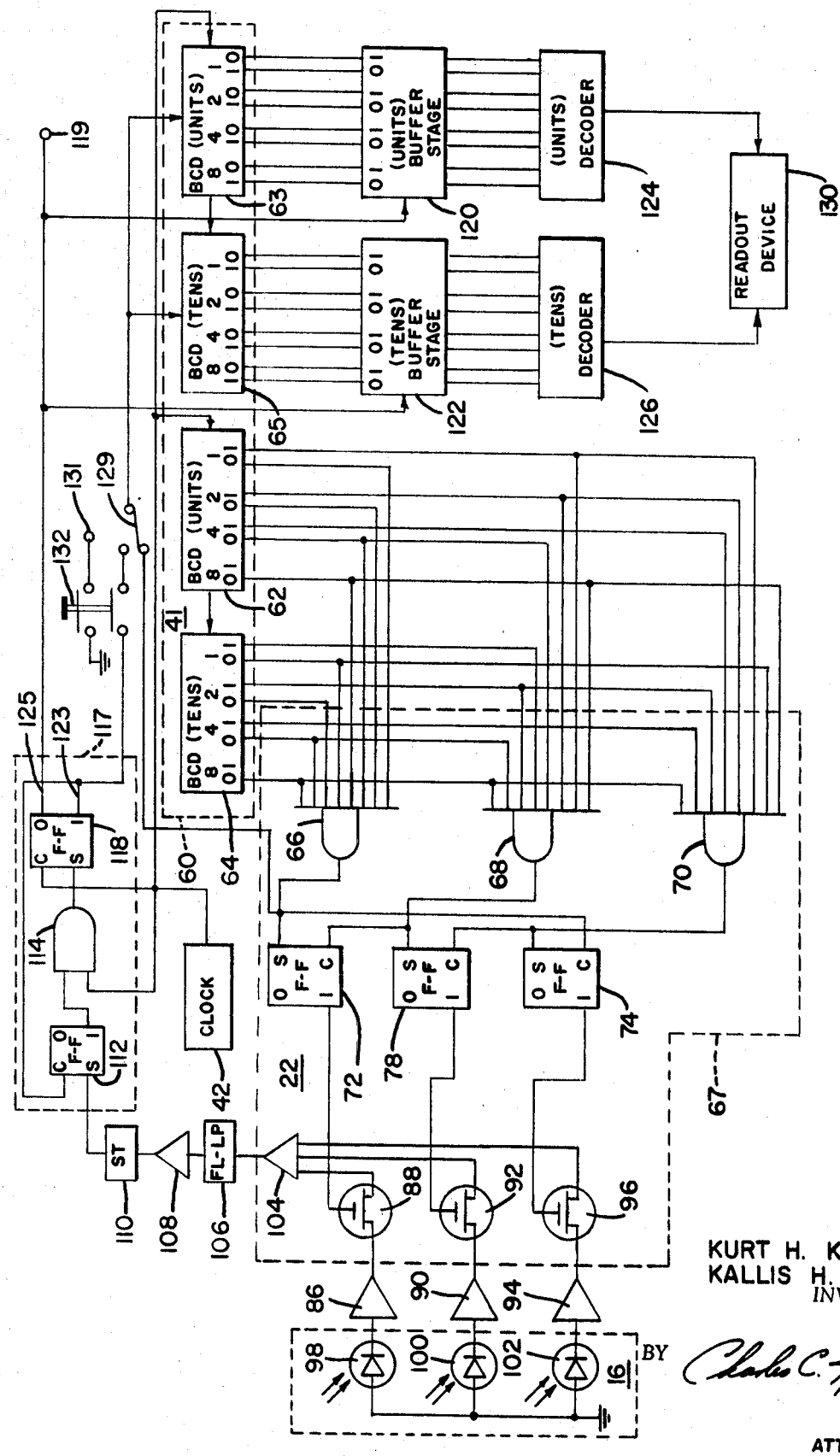
FIG. 4 is an expanded block diagram of a portion of the apparatus of FIG. 1.

In FIG. 1, a movable device 10, whose movement is to be observed and measured, is illustrated as mechanically coupled to a movable scale or grating 11. The movable grating 11 is positioned adjacent to an optical system 13 that directs a beam of radiation from a source 14 through the movable grating 11 and a similar stationary grating 15 to generate a series of cyclic radiation fringe patterns. When the two gratings 11 and 15 are superimposed with their line structure inclined at an angle with respect to each other, a Moiré fringe pattern is produced having an approximate sinusoidal distribution of radiation density. When the grating 11 is moved in a direction at right angles to its line structure, the fringe pattern moves at a right angle to the direction of movement. Accordingly, as the movable device 10 moves, the fringe pattern moves a corresponding amount. It is to be understood that the use of gratings to produce a cyclic radiation wave or fringe pattern is merely exemplary. Other methods, such as those using Michelson Interferometer, spectroscopic, etc. techniques can also be used.

A plurality of photosensors 16 are positioned along the path of movement of the fringe pattern so that each of the plurality of photosensors 16 receives radiation from a different portion of the cyclic fringe pattern. The photosensors 16 function to generate electrical signals, the amplitudes of which, are a function of the intensity of radiation received.

Figure 8:
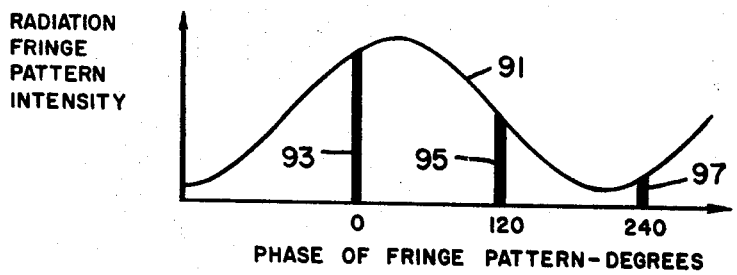
FIG. 8 is a plot of the intensity of a fringe pattern with respect to the photosensors of FIG. 4.

As illustrated in FIG. 2, a beam of radiation from the source 14 (illustrated as a lamp) is directed by the optical system 13 to the movable grating 11 (movable in the directions of the double ended arrow 17) having rulings thereon perpendicular to its directions of movement. The stationary grating 15 is mounted adjacent to the grating 11 with its rulings displaced at a slight angle with respect to the rulings of the grating 11 so that Moiré fringe patterns are developed to move in a direction of the arrows 18 as the scale 11 is moved. Three photodetectors 19, 20, and 21 are positioned along the direction of movement of the Moire fringe pattern so that each of the photosensors receives radiation from a different portion of the fringe pattern. For example, the three photodetectors 19, 20 and 21 can be mounted to receive radiation from a single cycle of fringe pattern or three different cycles of fringe patterns but phase shifted in the order of 120° as illustrated in FIG. 8. The photodetectors are coupled to apply a signal to a sequencing circuit 22.

In the second embodiment of a fringe generating apparatus (FIG. 3) a beam of radiation 23 is directed from a lamp 24 by a condenser lens 25 through an aperture 26 and a collimating lens 27 to a prism 28 mounted on a stationary base 29. The beam of radiation is reflected by the prism 28 to pass an aperture 30 in the stationary base and a second aperture 31 in a moving component 32, the movement of which is to be monitored. A scale or grating 33 (having rulings thereon) is attached to the moving component 32. The portion of the beam 23 passing through the scale 33 is directed by an objective lens system 34 through a spatial filter 35 onto a mirror 36. The beam is reflected by the mirror 36 to pass through a stationary grating 37 along which three photodetectors 38, 39 and 40 are positioned to receive radiation in the manner similar to that set forth in FIG. 2. As the scale 33 moves, the amplitude of the signal generated by the photodetectors changes in a cyclic or approximately sinusoidal pattern as a function of the relative position of the fringe pattern with respect to the photosensors.

A time basis is provided for the measuring apparatus by the counting circuit 41 (FIG. 1) coupled to receive timing pulses from a clock circuit 42. The counting circuit 41 includes a plurality of cyclic or repeatable type decade counters that cycle to continually count a predetermined number of timing pulses applied thereto.

The sequencing circuit 22 is coupled between the plurality of photosensors 16 and the counting circuit 41 for selectively accepting and passing the signals generated by the photosensors 16 to a filter circuit 43. The manner and sequence in which the signals are applied to the filter circuit 43 depends upon the number of photosensors employed and their relative position along the path of movement of said fringe pattern. For example, if three photosensors are used that are equally spaced along the cycles of the fringe pattern (as illustrated in FIGS. 2, 3 and 8), the sequencing circuit 22 functions to accept signals from each of the photosensors for separate equal periods, approximately one-third the counting cycle of the counting circuit 41.

The filter circuit 43 functions to accept the photosensor signals in the predetermined sequence to generate a periodic and cyclic alternating composite signal that is time phase related to the spatial fringe pattern phasing with respect to the photosensors 16 and synchronized with the counting cycle of the counting circuit 41. One cycle of composite signal is generated per counting cycle of the counting circuit 41. The output circuit of the filter circuit 43 is coupled to the input circuit of a crossover detector circuit 44. The crossover detector circuit 44 functions to determine when the composite signal has reached a predetermined portion of its cycle and generates a trigger or control signal at this time. One control signal is generated per counting cycle of the counting circuit 41. The operation of the sequencing circuit 22, filter 43 and crossover detector 44 is fully explained in a later portion of the specification.

The occurrence of the control signal with respect to the count in the counting circuit 41 provides a means for establishing the phase relation between the position of the fringe pattern and the photosensors 16. When the grating 11 is moved, the fringe pattern is moved so that the intensity of radiation received by the various photosensor 16 is correspondingly changed. The time basis of the sequencing circuit 22 remains the same as that the phase of the composite signal generated by the filter circuit 43 changes in correspondence with the movement of the fringe pattern. Since the crossover detector 44 generates a control signal at substantially the same predetermined portion of a cycle of the composite signal, the control signal now occurs at a changed count in the counting circuit 41 corresponding to the new position of the fringe pattern with respect to the photosensors 16.

A fractional fringe buffer stage 45 is coupled to the various output circuits of the counter circuit 41, and is also coupled to the crossover detector 44. In response to the control signal applied thereto, the buffer stage 45 accepts and stores a count corresponding to the count in the counting circuit 41. The buffer stage 45 is coupled to a conventional readout device 46 that provides a visual indication of the count in the counting circuit 41 corresponding to a given position of the fringe pattern with respect to the photosensors 16. If the device 10 is stationary, the count in the readout device 46 remains the same. If the device 10 subsequently moves, the phase relation of the fringe pattern with respect to the photo sensitive devices 16 changes. This changes the timing of the control signal generated by the crossover detector 44 with respect to the count cycle of the counting circuit 41 (in accordance with the change in position of the fringe pattern) so that a new count is received by the fractional fringe buffer stage 45 corresponding to the new position of the fringe pattern.

The counting circuit 41 and the crossover detector 44 are also coupled to a fringe count and direction detector circuit 47. The fringe count and direction detector circuit 47 functions to interrogate the counts received in the counting circuit 41 with respect to the occurrence of the control signal from the crossover detector 44 to determine when an entire or integral cycle of the fringe pattern has moved with respect to the photosensors 16. For example, a predetermined count in the counting circuit 41 can be designated as the end of one cycle of the fringe pattern and the start of a new cycle. Depending upon the time relation between the control signal and the count in the counting circuit 41 for two successive counting cycles, the fringe count and direction detector circuit 47 determines the direction in which the movable grating 11 has moved and whether a complete fringe cycle has moved with respect to the photosensors 16. The fringe count and direction detector 47 has two output circuits designated as the (−) negative (subtract) terminal and the (+) positive (add) terminal, one terminal for each direction of fringe pattern movement. A pulse is generated at one of the output terminals for each complete cycle of fringe pattern movement for the corresponding direction. The operation of the fringe count and direction detector circuit 47 is fully explained in a later portion of the specification.

The two output circuits of the fringe count and direction detector circuit 47 is coupled to a conventional reversible counter circuit 48. The reversible counter circuit 48 totals the number of pulses applied thereto (corresponding to the number of fringe patterns moved with respect to the photosensors 16) to provide a digital count corresponding to the total cycles of fringe pattern movement due to the movement of the grating 11. An integral fringe buffer stage 49 is coupled to the reversible counter circuit 48 and also to the crossover detector 44. In response to a control signal generated by the crossover detector 44, the integral buffer stage 49 receives the total counts stored in the reversible counter circuit 48 and applies them to a suitable integral fringe readout device 50. By observing the readout devices 46, and 50, a measurement of the movement of the movable device 10 is precisely indicated in cycles of fringe patterns and also small fractions thereof.

Referring now to FIG. 4, the counting circuit 41 (within the dashed block 60) is illustrated as having two parallel connected counters, each including two serially connected conventional binary coded decimal (BCD) decade counting units 62 and 64, and 63 and 65, respectively. Each decade counting unit includes four flip-flop stages where outputs are designated in the 1, 2, 4, 8 BCD code. The counting units 62 and 63 of both the parallel counters are connected to the clock circuit 42 and count once for each pulse applied thereto and are accordingly designated as the units counters. The counting units 64 and 65 are connected to the counting units 62 and 63, respectively, to count once for each 10 pulses counted by the counting units 62 and 63, respectively, and are accordingly designated as the tens counters. The counting units 62 and 64, and 63 and 65 function to perform a continuously repeatable counting cycle of 100 counts. Although the system is illustrated as employing the binary coded decimal (BCD) system, it is to be understood, however, that any counting system can be used, such as, for example, a natural binary system or a decimal system. Furthermore, any number of serially connected counting units can be employed in each parallel counter depending upon the resolution desired.

The sequencing circuit 22 (within the dashed block 67) includes three AND gate circuits, 66, 68 and 70 connected to selected output circuits of the counting units 62 and 64. The AND gate circuits 66, 68 and 70 are of the type that are rendered operative to produce a logic "1" at their output circuits when a logic "1" is present at all their input circuits. In the present embodiment, the AND gates 66, 68 and 70 are sequentially rendered operative on the counts of 0, 33, and 67, respectively. For simplification, as illustrated in FIG. 9, count number 00 for gate 66 is obtained by connecting the input of gate 66 to the 8 terminal of the Tens counter 64, which uniquely defines count number 00. Similarly number 33 for gate 68 is obtained by connecting the inputs of gate 68 to the 1, 2 and 4 terminals of the Units counter 62 and the Tens counter 64, which uniquely defines count number 33. Likewise, count number 67 for gate 70 is obtained by connecting the inputs of gate 70 to the 4 and 2 terminals of the Tens counter 64, and to the 1, 2 and 4 terminals of the Units counter 62, which uniquely defines count number 67.

The balance of the connections from the Units and Tens counters 62 and 64, respectively, to the AND gates 66, 68 and 70 are included for clarity and are understandably connected to the zero output side of the balance of the terminals.

The output circuit of the AND gate 66 is connected to the set terminal S of a flip-flop circuit 72 and the reset terminal C of a flip-flop circuit 74. The AND gate 68 is connected to the set terminal S of a flip-flop 78 and the reset terminal C of the flip-flop circuit 72. The AND gate circuit 70 is connected to the reset terminal C of the flip-flop circuit 78 and the set terminal S of the flip-flop circuit 74.

The flip-flop circuits of the FIGS. are illustrated in the set condition. The flip-flop circuits are set by the transition from a logic "0" to a logic "1" applied to the set terminal S and remain set until they are reset by applying the transition from a logic "0" to a logic "1" to the reset terminal C. The output circuit of the flip-flop 72 is connected to an input circuit of an ANALOG gate 88, the output circuit of the flip-flop 78 is connected to an input circuit of an ANALOG gate 92 and the output circuit of the flip-flop 74 is connected to an input circuit of an ANALOG gate 96. The other input circuits of the ANALOG gates 88, 92 and 96 are connected to the output circuits of amplifier circuits 86, 90 and 94, respectively. The input circuits of the amplifier circuits 86, 90 and 94 are connected to photosensors 98, 100 and 102, respectively. The output circuits of the ANALOG gates 88, 92 and 96 are connected to separate input circuits of a summing amplifier circuit 104.

The operation of the sequencing circuit 22 is now described with reference to FIGS. 7 and 8. The curves 67, 69 and 71 are a plot of the output signals of the flip-flops 72, 78, and 74, respectively, versus the counting cycle of the counting circuit 41 for three consecutive counting cycles. The flip-flops 72, 78 and 74 are set for the counts of 0—32, 33—66 and 67—99, respectively. As previously mentioned, the photosensors 98, 100 and 102 are positioned along different portions of the fringe pattern so that the intensity of radiation received by each of the photosensors depends upon the spatial phase relation of the fringe pattern with respect to the positioning of the photosensors. The curve 91 in FIG. 8 is a plot of radiation intensity versus the phase of the Moire fringe pattern for slightly more than a cycle of the fringe pattern. With the photosensors 98, 100 and 102 stationarily positioned along the path of travel of a fringe pattern with a spacing therebetween in the order of 120°, the intensity of radiation received by the photosensors 98, 100 and 102 is designated by the height of the dark bars 93, 95 and 97, respectively. As the fringe pattern moves, the intensity of the radiation received (the height of the dark bars) change accordingly.

When a zero count is registered by the counting units 62 and 64, a logic "1" is produced by the AND gate 66, which in turn sets the flip-flop 72 and resets the flip-flop 74. A logic "1," as illustrated by the curve 67, is applied to the ANALOG gate 88 which allows the signal generated by the photosensor 98 and amplified by the amplifier 86 to be applied to the summing amplifier 104. It should be noted a logic "0" is concurrently applied to the ANALOG gates 92 and 96 (flip-flops 74 and 78 are reset) rendering the gate circuits inoperative to pass signals. The logic "1" is applied to the ANALOG gate 88 until a count of 33 is reached wherein the flip-flop 78 is set and the flip-flop 72 is reset (curve 69). The ANALOG gate 88 is turned off and the ANALOG gate 92 is turned on to apply the signal from the photosensor 100 to the summing amplifier 104. At the count of 67, the flip-flop 74 is set and the flip-flop 78 is reset (curve 71). The flip-flop 74 turns the ANALOG gate 96 on to pass the signal from the photosensor 102 to the summing amplifier 104 until the counting units 62 and 64 are cycled through an entire count (00). ANALOG gates 88, 92 and 96 are commercially available devices. A logic "1" level originating at the outputs of flip-flops 72, 78 and 74 connected to the gate terminals of the ANALOG gates 88, 92 and 96 will transfer the analog gate input voltages originating at the outputs of amplifiers 86, 90 and 94 to the inputs of summing amplifier 104. A logic "0" level originating at the outputs of flip-flops 72, 78 and 74 connected to the gate terminals of ANALOG gates 88, 92 and 96 will prevent the ANALOG gate input voltages originating at the outputs of amplifiers 86, 90 and 94 from passing to the inputs of the summing amplifier 104.

It should be noted that if more than three photosensors are employed, or the photosensors are not evenly spaced along the fringe pattern, the logic circuitry can be rearranged to provide the correct sequencing. The number of AND gates depends upon the number of photosensors being employed and their sequencing depends on the positioning of the photosensors along the path of the fringe pattern.

Figure 7:
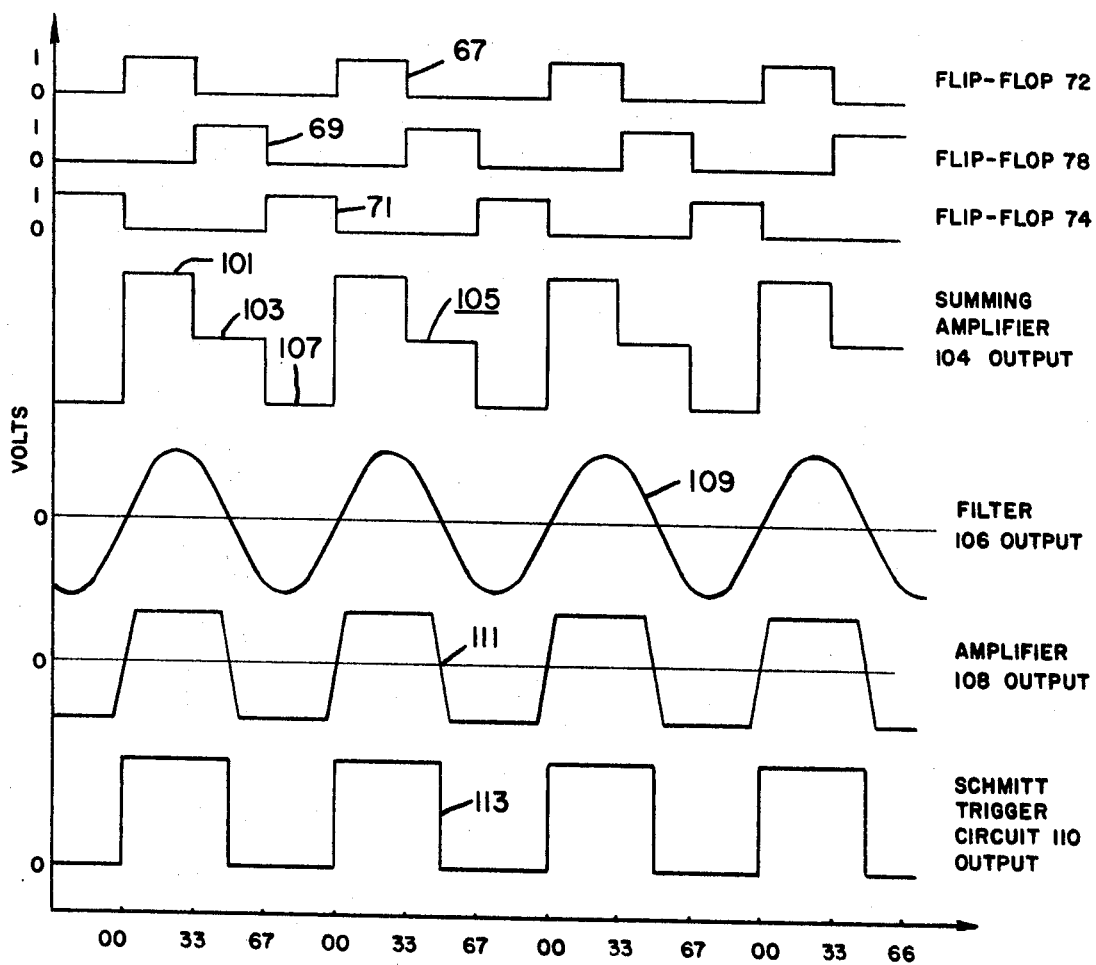
FIG. 7 is a graphic representation of electrical signals generated in the measuring apparatus of FIGS. 1 and 4.

The summing amplifier 104 receives the amplified and sequenced signals from the photosensors and produces the composite signal 105 as illustrated in FIG. 7. At the position of the fringe pattern 91 with respect to the photosensors as illustrated in FIG. 8, the curve portion 101 (during the count period of 0—33) corresponds to the output of the photosensor 98, the curve portion 103 (during the count period of 33—66) corresponds to the output of the photosensor 100 and the curve portion 107 (during the count period 67—99) corresponds to the output of the photosensor 102. As the fringe pattern 91 moves, the relative amplitudes of the photosensor signals change accordingly.

The summing amplifier 104 applies the composite signal 105 to a low-pass filter circuit 106, as shown in FIG. 4. The low-pass filter circuit 106 is tuned to a frequency determined by the duration of a counting cycle of the counting circuit 41. The low-pass filter circuit 106 forms a Fourier analysis of the signals applied thereto, to provide a composite electrical cyclic signal 109 (FIG. 7) having a fundamental sinusoidal wavelength that is phase related to the phase of the fringe pattern with respect to the photosensors 98, 100 and 102. A cycle of the signal 109 is generated for each counting cycle of the counting units 62 and 64, providing a signal representative of position of the fringe pattern with respect to the photosensors on a time basis.

An example of the filter circuit 106 is illustrated in FIG. 6. The filter circuit includes four parallel tuned inductance-capacitance (L–C) circuits 200, 202, 204 and 206 connected in series between an input terminal 208 and an output terminal 210. Five capacitors 212, 214, 216, 218 and 220 are connected between various sections of the tuned circuits 200—206 and a common terminal 222 adapted to be connected to a source of reference potential such as ground.

The output circuit of the filter 106 is coupled to a high gain amplifier 108 that is driven into saturation by the filtered composite signal 109 to produce the trapezoidal wave signal 111 of FIG. 7. The output circuit of the amplifier 108 is coupled to a Schmitt trigger circuit 110 to detect the point at which the saturated signal 111 passes through zero volts and generates the square wave synchronized to the signal 109 as illustrated by the curve 113 of FIG. 7. The signal generated by the Schmitt trigger circuit 110 is applied to a set terminal S of a flip-flop circuit 112 of an anticoincidence circuit (illustrated within the dashed block 117) in a manner so that the flip-flop 112 receives a set signal (logic "1") each time the Schmitt trigger changes from zero volts to the higher level.

An output circuit of the flip-flop 112 is coupled to apply a logic "1" (when set) to an input circuit of an AND gate 114. The other input circuit of the AND gate 114 receives logic "1" pulses from the clock circuit 42 so that a logic "1" is applied to the set terminal S of a flip-flop 118 in synchronization with a clock pulse. An output circuit 123 of the flip-flop 118 is coupled to the reset terminal C of the flip-flop 112 to reset the flip-flop 112. The reset terminal C of the flip-flop 118 is connected to the clock circuit 42 so that the flip-flop is reset by a following clock pulse. The other output circuit 125 of the flip-flop 118 is coupled to a "sync" terminal 119 and also to a pair of buffers 120 and 122. In effect, the flip-flops 112 and 118 and the AND gate 114 function as a synchronizing circuit to synchronize the logic "1" control signal developed by the Schmitt trigger 110 with a pulse of the clock circuit 42. The output pulse applied to the "sync" terminal 119 from the flip-flop 118 occurs approximately midway between the registration of counts in the counting units 62 and 64 and 63 and 65, i.e. halfway in between counting clock pulses generated by the clock 42.

Each of the buffer stages 120 and 122 include four flip-flop stages conventionally connected to corresponding flip-flop stages in the counting units 63 and 65, respectively. When a logic "1" is applied to the buffer stage 120 and 122 (from the flip-flop 118) the flip-flop stages in the buffer stages assume the count entered in the counting units 63 and 65.

The output stages of the flip-flops in the buffer stages 120 and 122 are connected to suitable decoder units 124 and 126. The decoder units 124 and 126 function to translate the binary coded decimal counts stored in the buffer stages 120 and 122 into the decimal system and apply them to a readout device 130. The buffer stages 120 and 122, the decoders 124 and 126, and the readout device 130 or the like, are well known and do not require any further explanation.

The various stages of the counting units 63 and 65 are connected to a preset switch 129. When the preset switch 129 is in the position as shown in FIG. 4, the two counting units 63 and 65 are reset to zero every time the two counting units 62 and 64 reach the number 00. The counting units 63 and 65 are therefore slaved to the counting units 62 and 64. When the preset switch 129 is in its other position the reset line of the counting units 63 and 65 is coupled to the system zero reset pushbutton or switch 132. When the reset switch 132 is depressed, the zero reset line is briefly connected to the flip-flop 118 output circuit 123. The reset is thus performed when a logic "1" is applied to the flip-flop 118 by the AND gate 114. The counting units 63 and 65 are thereby reset to zero shortly before a logic "1" is generated at the "sync" terminal 119, transferring a zero count in counting units 63 and 65 to the buffer stages 120 and 122. The readout device 130 will therefor read zero for this particular fringe phase with respect to the photosensors 98, 100, 102. Depressing reset switch 132 also connects a ground to a reversible counter zero reset terminal 131.

It should be noted, if a variable preset zero position is not required, the counting units 63 and 65 can be eliminated and the buffer stages 120 and 122 can be connected to the corresponding output circuits of the counting units 62 and 64.

In operation, as the fringe pattern moves with respect to the photosensors 98, 100 and 102, the intensity of the radiation applied to the photosensors changes, correspondingly changing the amplitude of the signal generated by the individual photosensors. As previously mentioned, each of the ANALOG gates 88, 92 and 96, are rendered operative for equal periods of time in a fixed sequence corresponding to a period of one-third the counting cycle of the counting circuit 41. Accordingly, since the sequence at which the ANALOG gates 88, 92 and 96 are rendered operative remains the same and the amplitude of their output signals changes along with changes in the position of the fringe pattern with respect to the photosensors, the phase of the composite signal at the output of the filter circuit 106 changes with respect to the counting cycle of the counting units 62 and 64 and 63 and 65.

The timing of the control signal generated by the Schmitt trigger 110 changes correspondingly so that the logic "1" applied to the buffer stages 120 and 122 (from the flip-flop 118 on the output circuit 125) occurs at a different portion of the counting cycle of the counting units 63 and 65. In effect, the cycle of a fringe pattern received by the photosensors is divided into 100 units (the number of counts in a counting cycle of the counting units 62 and 64, and the counting units 63 and 65). The time relation between the control signal generated by the Schmitt trigger 110 an the count in the counting units 63 and 65 provides an indication of the phase of the fringe pattern with respect to the photosensors 98—102. A reading of 0—99 will be shown in the readout device 130 corresponding to the position of the fringe pattern and the reading changes according to a movement of the fringe pattern which is less than an entire cycle of a fringe pattern.

The circuit provides for integral fringes to be counted in the reversible counter 48 whenever the fringe fraction count of from 00 to 99 crosses from 99 to 00 or from 00 to 99, adding or subtracting a count of 1 in the reversible counter 48, respectively. Direction detector circuit 47 allows for skipping of fringe fractions owing to excessive rate of fringe pattern motion by adding or subtracting an integral fringe count when the fringe fraction count changes from a number in the range from 80 to 99 to a number in the range from 00 to 19 and vice versa. Direction detector circuit 47 allows integral fringes to be counted only when the fringe fraction count crosses number 00 when passing from the range 80 to 99 to the range 00 to 19 or vice versa. Crossing the number 40 on the other hand will not result in an integral fringe count (note: 40 rather than 50 was chosen to reduce the number of logic connections).

The operation of the fringe count and direction detector circuit 47 is now explained in more detail with reference to FIGS. 5 and 9. Selected output circuits of the counting unit 65 are connected to the fringe counter and direction detection circuit 47 (enclosed within the dashed block 150 in FIG. 5). Two input circuits comprising a pair of AND gate circuits 160 and 162 are connected to the output circuits of the last two serially connected flip-flop stages of the counting unit 65 so that a logic "1" is applied to the input circuits when a count is stored in the counting unit 65 corresponding to the counting range of 0—39. Connection to the $\overline{4}$ and $\overline{8}$ terminals (i.e. 4 and 8 being 0) of the Tens counter 65 uniquely defines the count number in the range from 00 to 39 as best seen in FIG. 9. The range 00—39 is represented by dashed block 163 in FIG. 9. The third input circuit of the AND gate 162 is connected to the "sync" terminal 119 (which in turn is connected to the output circuit 125 of the flip-flop 118 of FIG. 4). The "sync" terminal 119 is also connected to an input circuit of an AND gate 166. The other input circuit of the AND gate 166 is connected through an inverter circuit 168 to the output of the AND gate 160.

The output circuit of the AND gates 162 and 166 are connected to the set terminal S and reset terminal C of the flip-flop circuit 170, respectively. One output circuit of the flip-flop 170 is connected through a differentiator circuit 172 to an AND gate 174 while the other output circuit is connected through a differentiator circuit 176 to an AND gate 178. The other input circuits of the AND gates 174 and 178 are connected to the "0" output circuits of the second and third serially connected flip-flop stages of the counting unit 65 to receive a logic "1" signal when a count has been registered in the counting circuit 41 corresponding to the range of 0—19 and 80—99. Connection of the AND gate 178 to the $\bar{2}$ and $\bar{4}$ terminals (i.e. 2 and 4 being "0") of the Tens counter 65 uniquely defines the count number ranges 00—19 and 80—99. This is the portion of the table in FIG. 9 enclosed within the dashed block 167. The output circuit of the AND gate 178 is connected to the subtract terminal 180 of the conventional reversible counter circuit 48 while the output circuit of the AND gate 174 is connected to the add terminal 182.

In operation, the AND gate 162 develops a logic "1" whenever the count in the BCD counting unit 65 is within the range of 0—39 (dashed block 163 of FIG. 9) and the "sync" is present at the terminal 119. The logic "1" developed by the AND gate 162 sets the flip-flop 170 to develop a momentary logic "1" through the differentiator circuit 172 to the AND gate 174. For the range of counts between 40—99 (dashed block 165) the logic "0" developed at the output circuit of the AND gate 160 is inverted so that the AND gate 166 resets the flip-flop 170 to the occurrence of a sync pulse on the "sync" terminal 119 and a momentary logic "1" applied to the AND gate 178 through the differentiator circuit 176. Accordingly, when a count of 0—39 (dashed block 163) is first received in the counting circuit 41, the flip-flop 170 is set and remains set until the count changes into the range of 40—99 (dashed block 165). At this time, the flip-flop 170 is reset and remains reset until the count is changed back to the range of 0—39 (dashed block 163).

As previously mentioned, a logic "1" is applied to the input circuits of the AND gates 174 and 178 whenever a count corresponding to 0—19 and 80—99, is reached in the counting unit 65. If the fringe pattern moves in one direction so that the count in the counting unit 65 changes from between the range of 40—99 (dashed block 165) to the range of 0—19, (upper dashed block 167) a logic "1" pulse is momentarily applied through the differentiator circuit 172 to the AND gate 174 at the same time a logic "1" is applied to the other input circuits of the AND gate 174 so that a logic "1" is developed at the add terminal 182 of the reversible counter 48. On the other hand, if the fringe pattern moves in the other direction so that the count in the counting unit 65 changes from the range of 0—39 (block 163) to a reading of 80—99 (lower dashed block 167), a logic "1" pulse is momentarily applied through the differentiator circuit 176 to the AND gate 178 at the same time the logic "1" signals are present at the other input circuits of the AND gate 178 and a logic "1" is applied to the subtract terminal 180 of the reversible counter 48.

It should be noted that a movement of the fringe pattern within the range of counts 20—79 (within the dashed block 169) when crossing from the count range 20—39 to the count range 40—79 or vice versa between two consecutive "sync" pulses causes the flip-flop 170 to change from one condition to the other counter adding a count to the reversible counter 48 since there are no logic "1" signals present at the other input circuits of the AND gates 174 and 178. Accordingly, it can be seen that by monitoring the cycling counts in the counting units 63 and 65 with respect to the occurrence of the "sync" pulse at the "sync" terminal 119, the direction of the movement at the fringe pattern is determined as well as the extent.

The reversible counter 48 may be a conventional circuit including for example, a plurality of series connected flip-flop stages connected as a binary coded decimal (BCD) reversible counting circuit to store a count corresponding to the total number of "addition" pulses applied to the terminal 182 less the number of "subtract" pulses supplied to the terminal 180. The plurality of flip-flop stages in the reversible counter are conventionally connected to an integral fringe buffer stage 184. The buffer stage 184 includes a number of flip-flop stages corresponding to the number of flip-flop stages in the reversible counter 48. When a "sync" pulse is applied to the buffer stage 184 through a suitable time-delay circuit 185, the flip-flop stages therein assume the position corresponding to the number of counts in the reversible counter 48. The buffer shift register 184 is connected to a conventional decoder unit 186 to decode the binary coded decimal (BCD) counting system into the decimal system and applies the signals stored therein to a readout device 188. The readout device 188 provides an indication corresponding to the number of integral cycles of movement of fringe pattern past the photosensors 98—102. The reversible counter 48 and buffer stage 184 are also connected to the reset terminal 131 to receive a signal for resetting the count stored in the units to a zero count at the time the zero reset pushbutton 132 is depressed.

From the above description it can be seen that an ultra precise movement of the movable device can be measured in cycles of fringe pattern and also in one hundredths of a cycle of fringe pattern. It should also be noted that the accuracy of the apparatus can be further increased by increasing the number of serially connected counting units employed in the counting circuit 41. For example if three serially connected counting units are used (rather than two as illustrated) the fringe pattern can be subdivided into thousandths of a cycle.

We claim:

1. Apparatus for determining the extent and sense of movement of a first object in one or other of two opposite directions with respect to a second object comprising:
    means for generating a cyclic radiation wave pattern adapted to move with respect to said second object in dependence on the relative movement of said first object;
    at least three detecting devices fixed with respect to said second object receiving radiation from different portions of said cyclic wave pattern to produce electrical signals each having an amplitude corresponding to the intensity of the portion of the cyclic wave pattern received;
    first circuit means for providing a cyclic timing sequence;
    means for continuing the cyclic timing sequence uniformly throughout periods of relative motion and periods of fixed relationship between said first and second objects;
    second circuit means responsive to said continuing cyclic timing sequence receiving said electrical signals from said detecting devices to periodically generate a cyclic electrical reference signal that is time phase related to the spatial phase of said cyclic wave pattern with respect to said detecting devices; and
    third circuit means for comparing the time phase of aid electrical reference signal with the cyclic timing sequence to provide signals corresponding to the extent and the direction of movement of said first object.

2. The apparatus as defined in claim 1 wherein, said third circuit means for providing signals corresponding to the extent and direction of movement of said first object, includes:
    separate means for generating a first signal corresponding to the number of integral wave patterns of movement with respect to said detection devices; and
    other means for generating a second signal corresponding to the fraction of a wave pattern of movement with respect to said detection devices thereby cooperating with said separate means for providing signals corresponding to the extent of movement of said first object.

3. Apparatus adapted to measure the movement of a cyclic radiation fringe pattern comprising:
first means for positioning a plurality of radiation sensitive devices along the path of movement of said fringe pattern to receive radiation in the form of said fringe pattern;
timing means for generating timing pulses;
counting means coupled to said timing circuit for counting said timing pulses;
second means coupled to said radiation sensitive devices and said counting means for selectively accepting signals from said radiation sensitive devices in accordance with predetermined numbers of timing pulses counted and for periodically generating a cyclic reference signal related in time phase to the spatial phase of said fringe pattern with respect to said radiation sensitive devices;
third means for detecting and generating a control signal when said electrical reference signal reaches a predetermined portion of its cycle; and
fourth means coupled to said counting circuit and responsive to said control signal to provide an output signal corresponding to number of timing pulses counted at the occurrence of the control signal that correspond to the relative position of sad fringe pattern with respect to said radiation sensitive devices.

4. Apparatus as defined in claim 3 including:
fifth circuit means coupled to said counting means responsive to said control signal for determining when said fringe pattern has moved an entire cycle and the direction of said movement; and
sixth circuit means coupled to said fifth circuit means responsive to said control signal for indicating the number of integral cycles of fringe pattern movement.

5. Apparatus as defined in claim 3 wherein:
said counting means comprises a circuit adapted to count and store a preset total number of pulses in a repeatable counting cycle;
said second circuit means includes a switching circuit connected between said radiation sensitive devices and a summing circuit, said switching circuit being coupled to said counting means to periodically apply the electrical signals generated by said radiation sensitive device to said summing circuit in a predetermined timing sequence, and filter means coupled to said summing circuit for generating said reference signal; and
said fourth means includes a circuit coupled to said counting means to register a count corresponding to the count in said counting means in response to said control signal thereby providing an output signal corresponding to the position of said fringe pattern with respect to said radiation sensitive devices.

6. Apparatus as defined in claim 5:
wherein a preset count in said counting means is designated as a reference count to indicate the end of a cycle of one fringe pattern and a start of the next cycle;
including circuit means coupled to said counting circuit and said third circuit means for comparing the occurrence of said control signal with respect to said preset count to determine whether said fringe pattern moved an entire cycle; and
including circuit means for totaling the number of cycles of movement of said pattern.

7. Apparatus for determining the relative positioning of two divisioned optical gratings, one of which is angularly disposed to the other, said apparatus comprising:
means for passing radiation through said gratings to produce a plurality of cyclic radiation patterns that vary in position in accordance to the relative movement between said gratings;
a plurality of radiation sensitive devices mounted to receive different portions of said radiation patterns and generate electrical signals corresponding to the intensity of radiation received;
timing means providing a continuously periodically repeatable timing cycle;
first circuit means, synchronized by said timing means, for selectively accepting said electrical signals from said radiation sensitive means in a periodically repeatable sequence and for transforming said selected electrical signals into a periodic electrical reference signal, the time phase relation of which, with respect to said timing cycle, changes in accordance with the change of relative position of said gratings; and
second circuit means receiving said electrical reference signal and comparing the time phase of said reference signal with said timing cycle to provide a signal corresponding to the relative position of said gratings.

8. Apparatus as defined in claim 7 wherein:
at least three radiation devices are substantially equally spaced to receive radiation from a different portion of a single radiation pattern; and
said first circuit means synchronized by said timing means accepts electrical signals from each of said radiation sensitive devices in sequence, for equal periods, corresponding to the timing cycle divided by the number of radiation sensitive devices.

9. Apparatus as defined in claim 8, wherein said first circuit means synchronized by said timing means applies said accepted electrical signals to a low pass filter to provide a cyclic reference signal having a frequency equal to said timing cycle.

10. Apparatus as defined in claim 7, wherein:
said timing means comprises means for generating periodic pulses and means for counting said pulses in a repeatable counting cycle; and
said first circuit means synchronized by said timing circuit includes a plurality of switching circuits coupled between said radiation sensitive devices and said counting means, said switching circuits being rendered operative to pass said electrical signals generated by said radiation sensitive devices to a common circuit in a predetermined sequence and for a predetermined number of counts determined by the number of radiation sensitive devices and their relative positions, and filter means connected to said common circuit to transform said passed electrical generating periodic into a cyclic electrical reference signal having a frequency equal to the period of said repeatable counting cycle.

11. Apparatus as defined in claim 10 wherein:
said circuit means receiving said electrical reference comprises means for detecting when said reference signal reaches a predetermined portion of its cycle to provide a control signal; and
means responsive to said control signal to provide a signal corresponding to the count in said counting means corresponding to the relative position of said gratings at the time of said control pulse.

12. Apparatus as defined in claim 7, wherein:
said timing means comprises means for generating periodic pulses and means for continuously counting said periodic pulses in a repeatable cycle; and
said circuit means receiving said electrical reference signal detects when said reference signal reaches a predetermined portion of its cycle to generate a control signal, and includes circuit means responsive to said control signal to provide a signal corresponding to the count in said counting means corresponding to the relative positioning of said gratings at the time of said control pulse.

13. Apparatus as defined in claim 12 including:
means monitoring the count in said counting means between successive control signals for generating a signal when the relative change of position between said gratings corresponds to a change of an integral cycle of said radiation pattern and for determining the direction of said movement, and
means coupled to said monitoring means for receiving said generated signals to provide a signal output corresponding to the total number of integral cycles of movement of said radiation pattern due to the relative movement of said gratings.

14. Apparatus for determining the extent and direction of movement of a cyclic radiation fringe pattern comprising:

means for generating a movable cyclic radiation fringe pattern for movement along a predetermined path;

a plurality of radiation sensitive means mounted along said path receiving radiation from different portions of said cyclic radiation fringe pattern and generating electrical signals corresponding to the amount of radiation received;

a timing circuit for providing timing pulses at a continuous rate;

first counting circuit means coupled to said timing circuit for continuously counting said timing pulses in a predetermined counting cycle;

a summing circuit;

a plurality of switching circuits coupled between said plurality of radiation sensitive means and said summing circuit;

circuit means coupled between said first counting circuit and said plurality plurality switching circuits selectively actuating each of said plurality of switching circuits in one counting cycle of said counting circuit for applying the electrical signals generated by the plurality of radiation sensitive means to said summing circuit means in a predetermined sequence to form a composite cyclic signal having a time period equal to said counting cycle and a time phase relation with respect to said counting cycle determined by the position of said radiation pattern with respect to said plurality of radiation sensitive means;

detection circuit means receiving said composite cyclic signal for generating a control signal when said cyclic signal reaches a predetermined portion of its cycle, and second counting circuit means coupled to said first counting circuit means and said detector circuit for receiving and storing a count therein corresponding to the count in said first circuit means at the time of the occurrence of said control signal thereby providing a digital signal corresponding to the position of said radiation fringe pattern with respect to said plurality of radiation means.

15. The apparatus as defined in claim 14 further including:

means for changing the time cycle phase of the second counting circuit means relative to the time cycle phase of the first counting circuit means.

16. Apparatus for determining the extent and sense of movement of a first object in one or other of two opposite directions with respect to a second object comprising:

means for generating a cyclic radiation wave pattern having a predetermined period, the pattern being movable with respect to the second object in dependence on the relative movement of the first object;

N number of detecting devices fixed with respect to the second object receiving radiation from different portions of the cyclic wave pattern to produce electrical signals each having an amplitude corresponding to the intensity of the portion of the cyclic wage pattern received;

first circuit means for providing a cyclic timing sequence;

second circuit means responsive to the cyclic timing sequence, receiving the electric signals from the N detecting devices and periodically generating a cyclic electric signal that is phase related to the spatial phase of the cyclic wave pattern with respect to the detecting devices, the second circuit having N gate circuits each of which is closed for a time interval which is a function of the number of gate circuits and the cyclic timing sequence; and third circuit means for comparing the phase of the electrical reference signal with the cyclic timing sequence to provide signals corresponding to the extent and direction of movement of the first object.

17. The apparatus as defined in claim 16, wherein the N detecting devices are spaced apart at increments, the length of which are a function of the predetermined period and the number of detecting devices.

18. The apparatus as defined in claim 17, wherein the detecting devices are spaced at increments the length of which are defined by the quotient of a ratio comprising the predetermined period divided by the number of detecting devices.

19. The apparatus as defined in claim 16, wherein the cyclic timing sequence includes X timing pulses and the gate circuits are closed for a time defined by a ratio comprising X timing pulses divided by the number of gate circuits.

UNITED STATES PATENT OFFICE
CERTIFICATE OF CORRECTION

Patent No. 3,588,462　　　　　Dated　June 28, 1971

Inventor(s)　KURT H. KRECKEL and KALLIS H. MANNIK

It is certified that error appears in the above-identified patent and that said Letters Patent are hereby corrected as shown below:

Column 4, line 6, change "photosensor" to -- photosensors --;
　　　　line 8, change "as" to -- so --;

Column 6, line 62, change "0-33" to -- 0-32 --;

Column 7, line 1, after "is" insert -- time --;
　　　　after "the"(1st occurrence) insert --spatial--;

Column 8, line 38, change "an" to -- and --;

Column 9, line 8, change "circuit" to -- circuits --;
　　　　line 71, cancel "counter" (1st occurrence) and
　　　　　　insert -- without --;

Column 12, lines 40-41, cancel "generating periodic" and
　　　　　　insert -- signals --;

Column 14, line 14, change "wage" to -- wave --

Signed and sealed this 14th day of December 1971.

(SEAL)
Attest:

EDWARD M. FLETCHER, JR.　　　　　ROBERT GOTTSCHALK
Attesting Officer　　　　　　　　Acting Commissioner of Patents